US012429666B2

(12) United States Patent
Okada et al.

(10) Patent No.: US 12,429,666 B2
(45) Date of Patent: Sep. 30, 2025

(54) OPTICAL APPARATUS AND IMAGE PICKUP APPARATUS INCLUDING THE SAME

(71) Applicant: CANON KABUSHIKI KAISHA, Tokyo (JP)

(72) Inventors: Tadanori Okada, Tochigi (JP); Toshihiro Okuda, Tochigi (JP); Takehiko Sato, Tochigi (JP); Kunihiko Sasaki, Tochigi (JP); Shu Ito, Tochigi (JP); Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 779 days.

(21) Appl. No.: 17/720,648

(22) Filed: Apr. 14, 2022

(65) Prior Publication Data

US 2022/0350106 A1 Nov. 3, 2022

(30) Foreign Application Priority Data

Apr. 28, 2021 (JP) ................................. 2021-075725

(51) Int. Cl.
*G02B 7/04* (2021.01)
*G02B 7/02* (2021.01)
(Continued)

(52) U.S. Cl.
CPC ............... *G02B 7/04* (2013.01); *G02B 7/021* (2013.01); *G02B 27/646* (2013.01); *G03B 17/14* (2013.01)

(58) Field of Classification Search
CPC . G02B 7/02; G02B 7/704; G02B 7/10; G02B 7/021; G02B 7/022; G02B 7/102;
(Continued)

(56) References Cited

U.S. PATENT DOCUMENTS

| 6,473,567 | B1 | 10/2002 | Kaisha |
| 7,508,605 | B2 | 3/2009 | Nishikawa et al. |
| 2008/0174882 | A1* | 7/2008 | Asano ................... G02B 7/102 |
| | | | 359/694 |

FOREIGN PATENT DOCUMENTS

| CN | 101029961 A | 9/2007 |
| JP | S5322410 A | 3/1978 |

(Continued)

OTHER PUBLICATIONS

English translation of JPS 5322410. (Year: 1978).*

*Primary Examiner* — Jie Lei

(74) *Attorney, Agent, or Firm* — ROSSI, KIMMS & McDOWELL LLP

(57) ABSTRACT

Provided is a lens barrel including: a fifth lens unit barrel; a fourth lens unit barrel; a linear ultrasonic motor configured to electrically drive the fourth lens unit barrel in an optical axis direction; a rack configured to transfer a driving force of the linear ultrasonic motor to the fourth lens unit barrel; a rack spring configured to bias the rack so that the rack is brought into contact with the fourth lens unit barrel; and a rack guide shaft. The rack guide shaft is fixed to the fourth lens unit barrel. The fourth lens unit barrel and the rack move together in the optical axis direction. When the fifth lens unit barrel is brought into contact with the fourth lens unit barrel, a relative position of the fourth lens unit barrel and the rack in the optical axis direction changes against a biasing force of the rack spring.

8 Claims, 10 Drawing Sheets

(51) Int. Cl.
*G02B 27/64* (2006.01)
*G03B 17/14* (2021.01)

(58) Field of Classification Search
CPC ........ G02B 7/14; G02B 27/64; G02B 27/646;
G03B 17/14; G03B 17/12; G03B 17/565;
G03B 17/56; G03B 5/00; G03B 5/06;
G03B 3/10; G03B 3/02; G03B 2205/0046
USPC ........ 359/821–823, 811, 819, 826, 694, 699,
359/700, 701, 714; 396/529, 530, 533,
396/535, 544
See application file for complete search history.

(56) References Cited

FOREIGN PATENT DOCUMENTS

| | | | |
|---|---|---|---|
| JP | 2000180693 | A | 6/2000 |
| JP | 2002296481 | A | 10/2002 |
| JP | 2007292864 | A | 11/2007 |
| JP | 2008197617 | A | 8/2008 |
| JP | 2013186239 | A | 9/2013 |

* cited by examiner

OPTICAL APPARATUS AND IMAGE PICKUP APPARATUS INCLUDING THE SAME

BACKGROUND OF THE INVENTION

Field of the Invention

The present disclosure relates to an optical apparatus and an image pickup apparatus including the optical apparatus.

Description of the Related Art

There has been known a lens barrel having a retreating structure using a biasing member. When a lens unit that is moved manually or by an external driving unit moves into a movement range of a lens unit that is moved by using an electric driving unit, holding members for the lens units may interfere with each other. In view of this problem of interference, the lens barrel has the retreating structure.

In Japanese Patent Application Laid-Open No. 2008-197617, there is disclosed a lens barrel that absorbs impact of interference. When a focus lens holding member and an image blur optical correction unit interfere with each other, a rack member is displaced with respect to the focus lens holding member, and a coil spring provided between the rack member and the focus lens holding member is displaced. In this manner, the impact of interference is absorbed. In Japanese Patent Application Laid-Open No. 2000-180693, there is disclosed a lens barrel that maintains a meshing state of a rack with a feed screw. When an external force is applied to a movable lens frame, a rack spring provided between the movable lens frame and a rack is displaced, and a stopper of the movable lens frame abuts against a fixed lens frame. In this manner, the meshing state of the rack with the feed screw is maintained.

However, the lens barrels described above have the following problems. The lens barrel disclosed in Japanese Patent Application Laid-Open No. 2008-197617 includes guide shafts extending in a fore-and-aft direction, which is an optical axis direction. The guide shafts guide the focus lens holding member that is driven by a motor unit and a transfer member, respectively. This configuration increases an overall size of the lens barrel. Further, the lens barrel disclosed in Japanese Patent Application Laid-Open No. 2000-180693 includes the rack having a shaft extending in the optical axis direction. This configuration increases an overall size of the lens barrel.

An object of the present disclosure is to provide an optical apparatus having a reduced size and an image pickup apparatus including the optical apparatus.

SUMMARY OF THE INVENTION

In order to achieve above-mentioned object, according to the present disclosure, there is provided an optical apparatus including: a first holding member which is configured to hold a first lens unit, and is movable in an optical axis direction; a second holding member which is configured to hold a second lens unit, and is movable in the optical axis direction; a driving unit configured to electrically drive the second holding member in the optical axis direction; a transfer member configured to transfer a driving force of the driving unit to the second holding member; a biasing member configured to bias the transfer member so that the transfer member is brought into contact with the second holding member at a predetermined position; and a guide shaft member configured to guide the transfer member, wherein the guide shaft member is fixed to the second holding member, and wherein, when the first holding member is brought into contact with the second holding member, a relative position of the second holding member and the transfer member in the optical axis direction change against a biasing force of the biasing member.

According to the present disclosure, an optical apparatus having a reduced size and an image pickup apparatus including the optical apparatus can be provided.

Further features of the present invention will become apparent from the following description of exemplary embodiments with reference to the attached drawings.

DESCRIPTION OF THE EMBODIMENTS

Embodiment

Preferred embodiments of the present invention will now be described in detail in accordance with the accompanying drawings.

Figure 1:
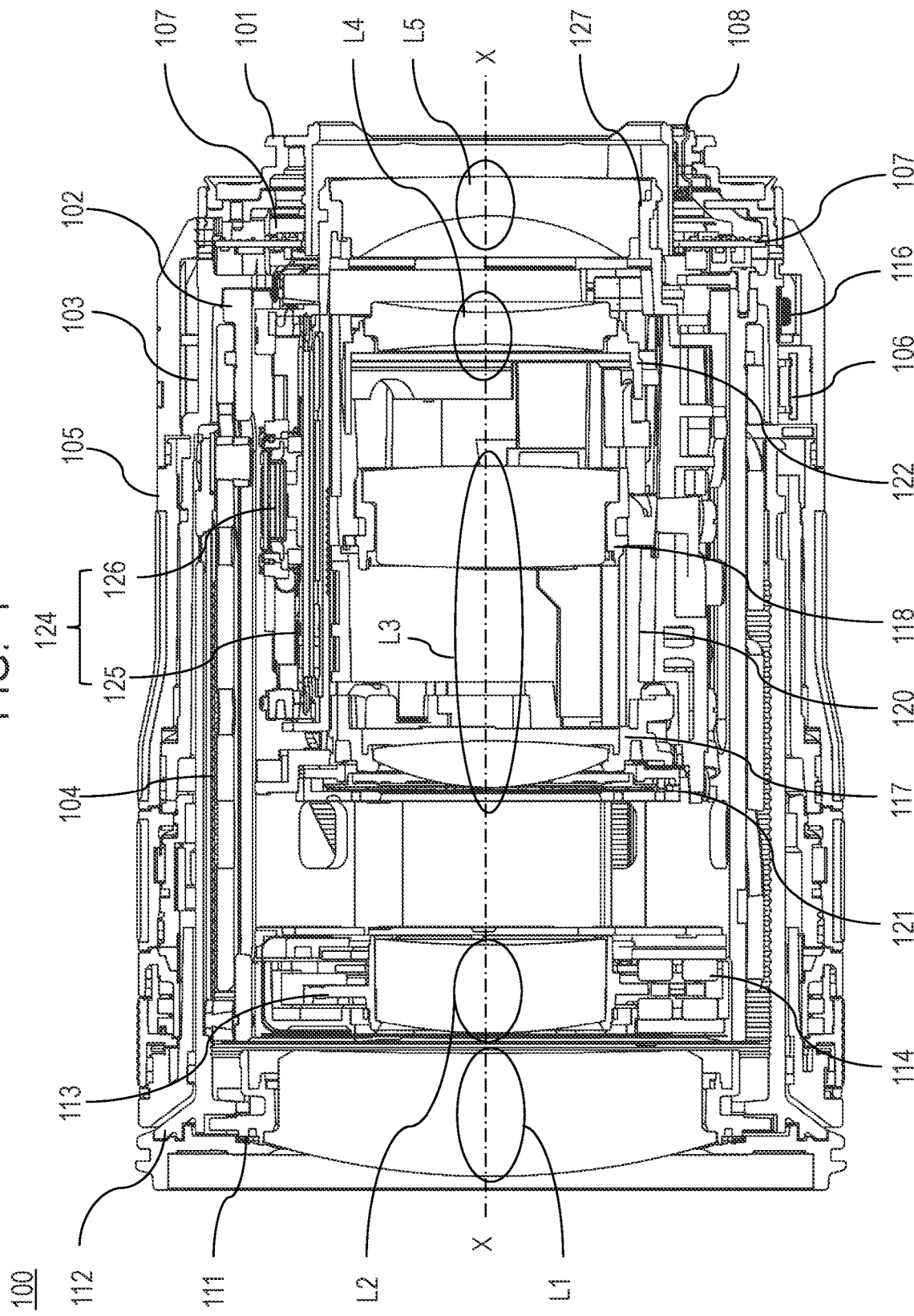
FIG. 1 is a sectional view of a lens barrel (100) according to an embodiment of the present disclosure when zoom is set to a wide-angle end and focus is set to infinity.
Figure 2:
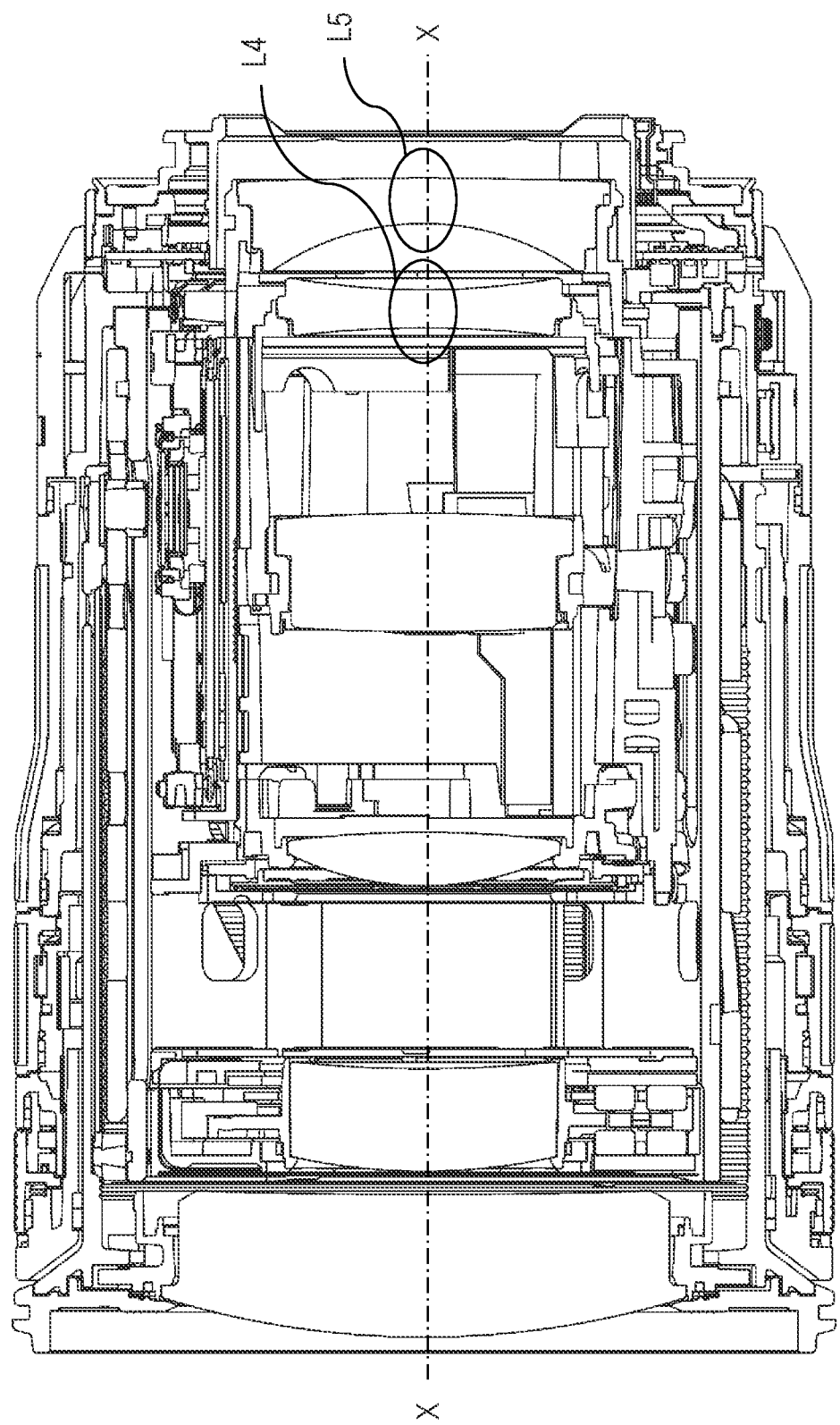
FIG. 2 is a sectional view of the lens barrel (100) of FIG. 1 when zoom is set to the wide-angle end and focus is set to a closest distance.
Figure 3:
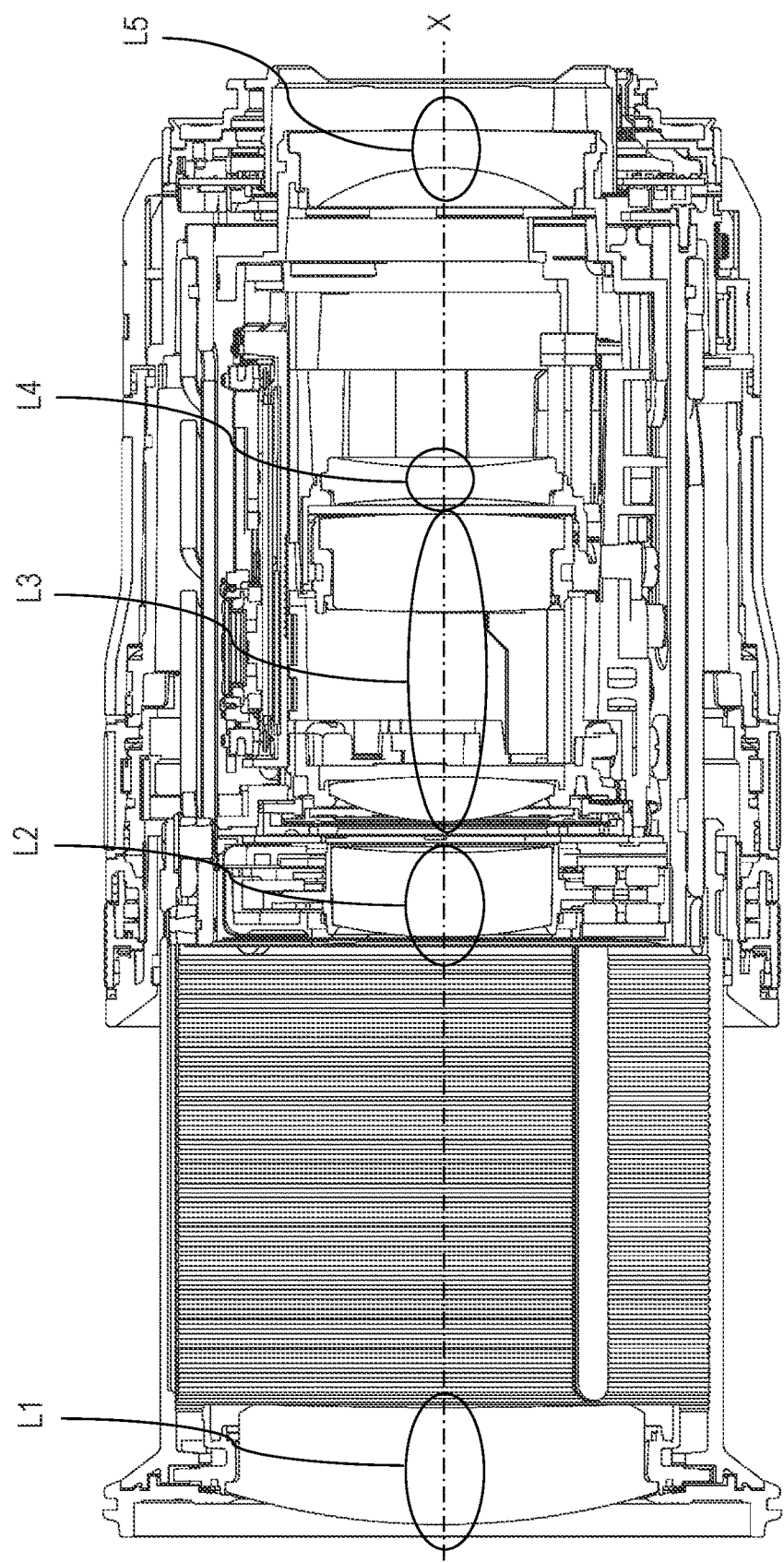
FIG. 3 is a sectional view of the lens barrel (100) of FIG. 1 when zoom is set to a telephoto end and focus is set to the infinity.
Figure 4:
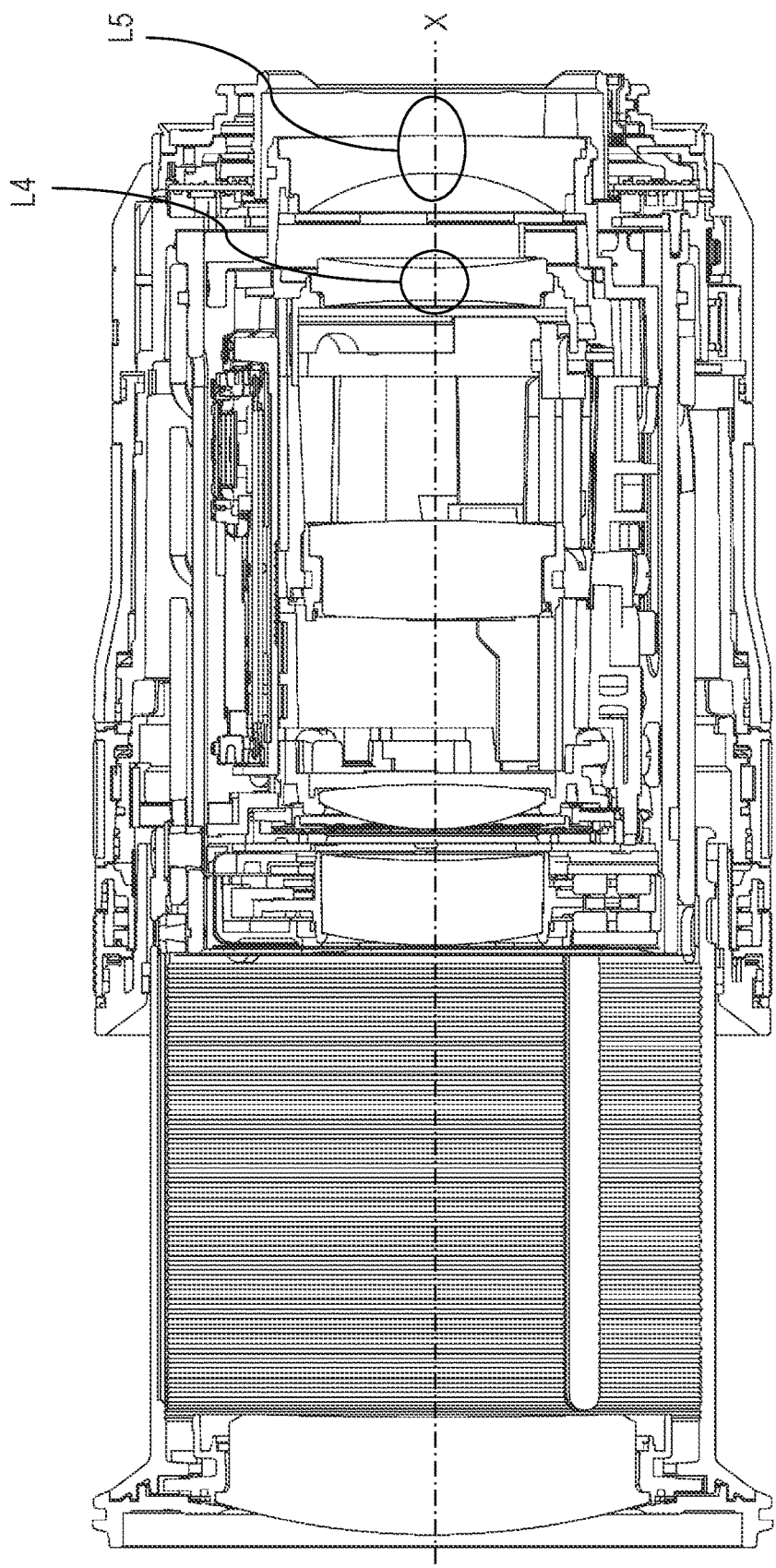
FIG. 4 is a sectional view of the lens barrel (100) of FIG. 1 when zoom is set to the telephoto end and focus is set to the closest distance.

FIG. 1 is a sectional view of a lens barrel 100 according to an embodiment of the present disclosure when zoom is set to a wide-angle end and focus is set to infinity. FIG. 2 is a sectional view of the lens barrel 100 of FIG. 1 when zoom is set to the wide-angle end and focus is set to a closest distance. FIG. 3 is a sectional view of the lens barrel 100 of FIG. 1 when zoom is set to a telephoto end and focus is set to the infinity. FIG. 4 is a sectional view of the lens barrel 100 of FIG. 1 when zoom is set to the telephoto end and focus is set to the closest distance. In FIG. 1 to FIG. 4, a line X-X represents an optical axis.

In FIG. 1, a mount 101 is a component to be fixed to an image pickup apparatus main body (not shown). A guide barrel 102 and a fixed barrel 103 are both integrally fixed to the mount 101. A cam ring 104 is held on an outer peripheral surface of the guide barrel 102 so as to be rotatable about the optical axis. The cam ring 104 is coupled to a zoom ring 105 through intermediation of a key member (not shown). The zoom ring 105 is rotatably held on an outer peripheral surface of the fixed barrel 103. When the zoom ring 105 is externally operated, the cam ring 104 rotates together with the zoom ring 105. A zoom sensor 106 is fixed onto the fixed barrel 103. The zoom sensor 106 is capable of electrically detecting a rotation angle of the zoom ring 105. The zoom sensor 106 is electrically connected to a control board 107 disposed in the vicinity of the mount 101, and transmits focal-length information in zooming to a control circuit. A contact block 108 is electrically connected to the control board 107, and functions to communicate with the image pickup apparatus main body (not shown) and receive power supply.

A first lens unit L1 is fixed to a first lens unit barrel 111. The first lens unit barrel 111 is fixed to a linear movement barrel 112.

A second lens unit L2 is held in a second lens unit barrel 113. The second lens unit barrel 113 is held by a shift unit 114 so as to be movable in a plane orthogonal to the optical axis. The shift unit 114 includes, for example, an actuator and a sensor. The actuator drives the second lens unit barrel 113. The sensor detects a driving amount of the second lens unit barrel 113. The shift unit 114 is fixed to the guide barrel 102. The shift unit 114 is electrically connected to the control board 107. The control board 107 controls driving of the second lens unit barrel 113 so that a blur is corrected based on a blur signal detected by a blur sensor 116 that is mounted to the fixed barrel 103.

A third lens unit L3 is held in a 3A lens unit barrel 117 and a 3B lens unit barrel 118. The 3A lens unit barrel 117 and the 3B lens unit barrel 118 are both fixed to a third lens unit base barrel 120 (base member). An electromagnetic stop unit 121 is held in the third lens unit base barrel 120, and is electrically connected to the control board 107.

A fourth lens unit L4 (second lens unit) is held in a fourth lens unit barrel 122 (second holding member). The fourth lens unit barrel 122 is held on the third lens unit base barrel 120 by guide bars 123a and 123b (lens guide units) described later so as to be movable in an optical axis direction. The fourth lens unit L4 is a focus lens unit for focus adjustment. The fourth lens unit barrel 122 is electrically driven in the optical axis direction by a linear ultrasonic motor 124 (driving unit) held on the third lens unit base barrel 120.

The linear ultrasonic motor 124 includes a fixed unit 125 and a movable unit 126. The linear ultrasonic motor 124 includes a piezoelectric element. When the piezoelectric element is oscillated at a frequency within an ultrasonic range, the linear ultrasonic motor 124 drives the movable unit 126 in the optical axis direction. The fixed unit 125 of the linear ultrasonic motor 124 is held on the third lens unit base barrel 120. This configuration allows the linear ultrasonic motor 124 to be held on the third lens unit base barrel 120. The piezoelectric element is electrically connected to the control board 107 via a flexible printed board (not shown).

A fifth lens unit L5 (first lens unit) is held in a fifth lens unit barrel 127 (first holding member). The first lens unit L1, the third lens unit L3, and the fifth lens unit L5 are moved in zooming. Cam followers (not shown) are fixed to the linear movement barrel 112, the third lens unit base barrel 120, and the fifth lens unit barrel 127, respectively. The cam followers are engaged with linear movement grooves of the guide barrel 102 and cam grooves of the cam ring 104. When the cam ring 104 is rotated, the first lens unit L1, the third lens unit L3, and the fifth lens unit L5 can move linearly in the optical axis direction.

The fourth lens unit L4, which is a focus lens unit, is held in the fourth lens unit barrel 122 that is held on the third lens unit base barrel 120. Thus, the fourth lens unit L4 is driven in the optical axis direction by the linear ultrasonic motor 124 while moving together with the third lens unit base barrel 120 in zooming. In FIG. 2 to FIG. 4, positions of the lens units, which are moved in zooming, are exemplified.

Figure 5:
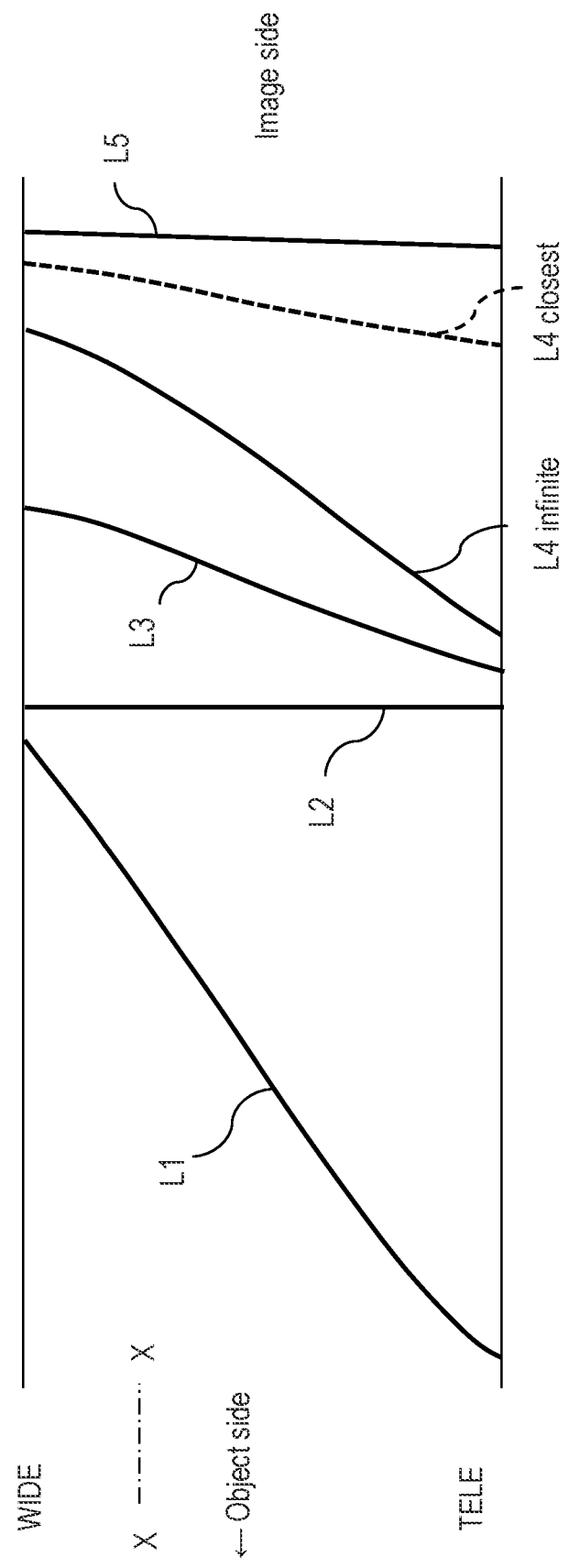
FIG. 5 is a diagram for illustrating movement locus of lens units moved in zooming.

FIG. 5 is a diagram for illustrating movement locus of the lens units moved in zooming. Movement locus of the lens units from a wide-angle (WIDE) end to a telephoto (TELE) end is illustrated. As illustrated in FIG. 5, the first lens unit L1, the third lens unit L3, and the fifth lens unit L5 are moved in zooming, while the second lens unit L2 is not moved in zooming. For the fourth lens unit L4, a movement locus of the fourth lens unit L4 when focus is set to infinity is illustrated as "L4 infinite", whereas a movement locus of the fourth lens unit L4 when focus is set to a predetermined closest distance is illustrated as "L4 closest".

Positional information of the fourth lens unit L4 that is focused at a focus position ranging from infinity to the closest distance is stored for a focal length ranging from the wide-angle end to the telephoto end. The driving of the fourth lens unit barrel 122 is controlled by the linear ultrasonic motor 124 based on the positional information and the focal-length information detected by the zoom sensor 106 so that the fourth lens unit barrel 122 tracks the locus illustrated in FIG. 5.

Figure 6:
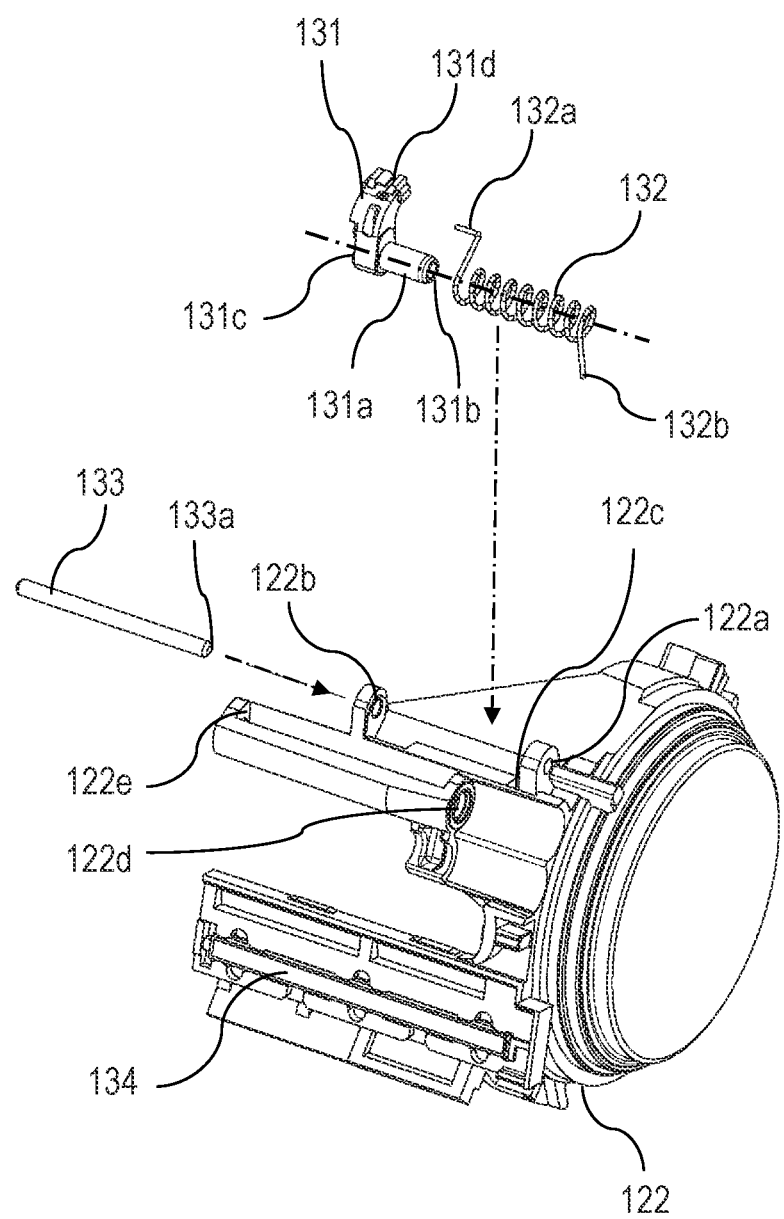
FIG. 6 is an exploded perspective view of a rack holding mechanism of a fourth lens unit barrel (122).
Figure 7:
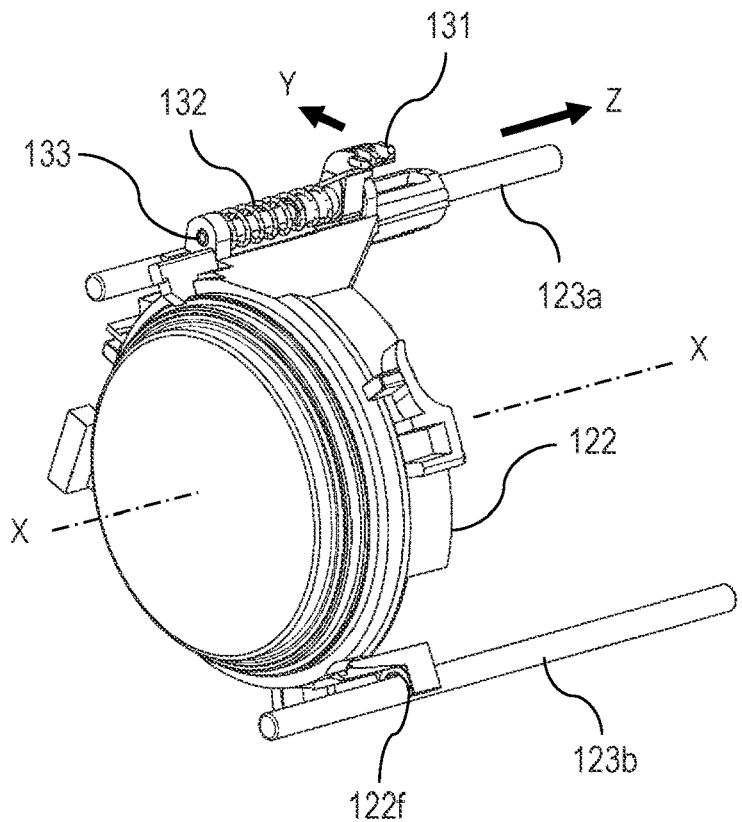
FIG. 7 is a perspective view of the fourth lens unit barrel (122) into which a rack (131) is mounted.

Next, a holding structure of the fourth lens unit barrel 122, which holds a rack 131 (transfer member), is described. FIG. 6 is an exploded perspective view of a configuration of a rack holding mechanism of the fourth lens unit barrel 122. FIG. 7 is a perspective view of the fourth lens unit barrel 122 into which the rack 131 is mounted.

The rack 131 has a shaft portion 131a. The shaft portion 131a is inserted into a rack spring 132 (biasing member). Then, the rack 131 and the rack spring 132 are inserted into a space between a portion having a rack shaft hole 122a and a portion having a rack shaft hole 122b of the fourth lens unit barrel 122. Further, a rack guide shaft 133 (guide shaft member) is inserted into a slide hole 131b of the rack 131 so as to pass therethrough, and thus is fitted into the rack shaft holes 122a and 122b. An end portion 133a of the rack guide shaft 133 is press-fitted into the rack shaft hole 122a to thereby fix the rack guide shaft 133 to the fourth lens unit barrel 122 without backlash. Movement of the rack 131 is restricted by the rack guide shaft 133. The above-mentioned configuration allows the rack 131 to be held in such a manner as to be movable in the optical axis direction with respect to the rack guide shaft 133 and to be held in such a manner as to be rotatable about the rack guide shaft 133.

In this case, the rack 131 is always biased in a Z direction illustrated in FIG. 7, which is parallel to the optical axis direction, by a biasing force of the rack spring 132. An end portion 131c of the rack 131 is always held in contact with the portion of the fourth lens unit barrel 122, which has the rack shaft hole 122b. As a result, the rack 131 is held in contact with the fourth lens unit barrel 122 at a predetermined position. A state in which the rack 131 is in contact with the fourth lens unit barrel 122 is referred to as "contact state". Then, the fourth lens unit barrel 122 and the rack 131 can move together in the optical axis direction.

Further, the rack spring 132 has a hook portion 132*a* at its one end and an extended portion 132*b* at another end opposite to the one end. The hook portion 132*a* is engaged with the rack 131. The extended portion 132*b* is inserted into a spring insertion hole 122*c* of the fourth lens unit barrel 122. With this configuration, the rack 131 is always biased in a Y direction illustrated in FIG. 7 about the rack guide shaft 133 as a center of rotation. Specifically, the rack spring 132 biases the rack 131 in the optical axis direction with respect to the fourth lens unit barrel 122, and biases the rack 131 in a rotating direction about the rack guide shaft 133. The rack 131 has a V-shaped groove portion 131*d* formed at its distal end. The V-shaped groove portion 131*d* is always engaged with a protruding portion (not shown) of the movable portion 126 of the linear ultrasonic motor 124. This configuration enables a driving force of the linear ultrasonic motor 124 to be transferred to the fourth lens unit barrel 122 without backlash owing to the biasing force of the rack spring 132 even when the components vary in accuracy.

A scale 134 illustrated in FIG. 6 is a component having a pattern continuous in the optical axis direction. The scale 134 is bonded and fixed to a groove of the fourth lens unit barrel 122. A position sensor (not shown) mounted to the third lens unit base barrel 120 reads the pattern of the scale 134 to detect a position of the fourth lens unit barrel 122 relative to the third lens unit base barrel 120 in the optical axis direction.

Both ends of each of the guide bars 123*a* and 123*b* illustrated in FIG. 7 are fixed to the third lens unit base barrel 120. The guide bar 123*a* is inserted through sleeve holes 122*d* and 122*e* (see FIG. 6) of the fourth lens unit barrel 122, and holds the fourth lens unit barrel 122 so that the fourth lens unit barrel 122 is movable in the optical axis direction. The fourth lens unit barrel 122 is moved by the linear ultrasonic motor 124 in the optical axis direction relative to the third lens unit base barrel 120. The guide bar 123*b* is engaged with a U-shaped groove 122*f* of the fourth lens unit barrel 122 to thereby prevent the fourth lens unit barrel 122 from rotating about the guide bar 123*a*.

Figure 8:
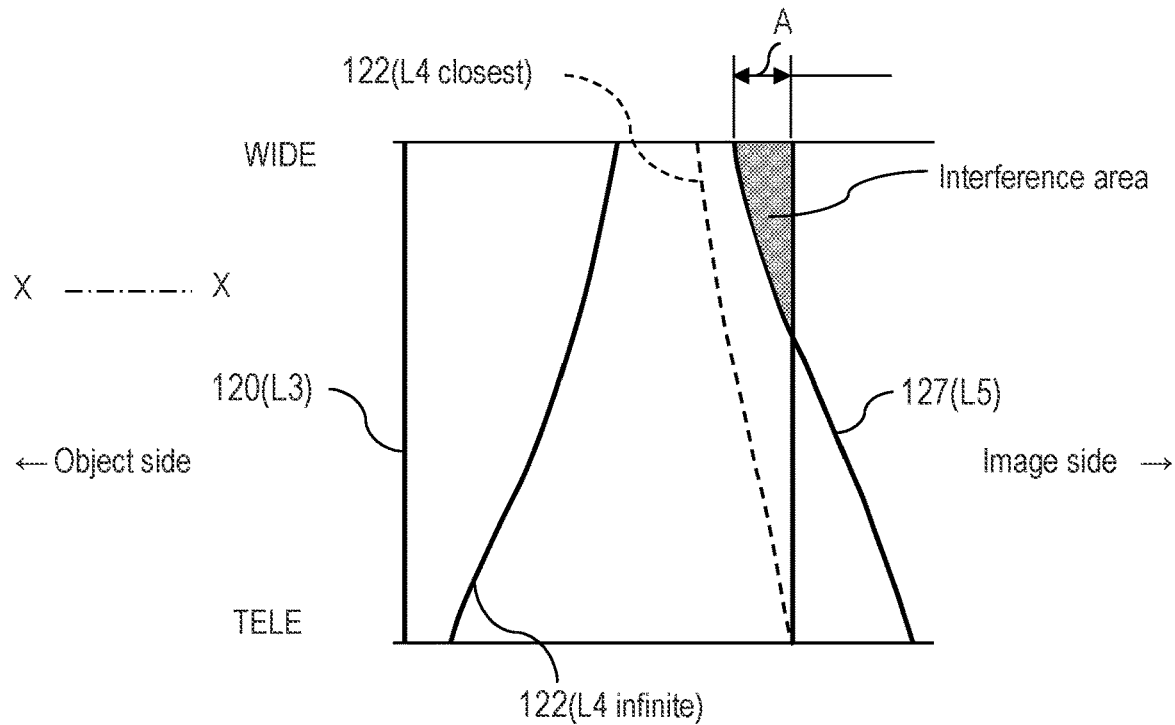
FIG. 8 is a diagram for illustrating movement locus of the fourth lens unit barrel (122) and a fifth lens unit barrel (127) with respect to a movement locus of a third lens unit base barrel (120) as a reference.

Next, driving of the focus lens unit according to the present disclosure is described. FIG. 8 is a diagram for illustrating a movement locus 122 (L4 closest) and a movement locus 122 (L4 infinite) of the fourth lens unit barrel 122 and a movement locus 127 (L5) of the fifth lens unit barrel 127 with respect to a position of a movement locus of the third lens unit base barrel 120 (120 (L3)) as a reference when a zoom position is changed from the wide-angle end to the telephoto end. A distance between the movement locus in the optical axis direction represents a clearance between the group lens barrels. Thus, when the movement locus intersect, the group lens barrels interfere with each other.

When focus is set to infinity, driving of the fourth lens unit barrel 122 that holds the fourth lens unit L4, which is a focus lens unit, is controlled by the linear ultrasonic motor 124 so that the fourth lens unit barrel 122 tracks a solid line indicating the movement locus 122 (L4 infinite) in zooming. Further, when focus is set to the closest distance, the driving of the fourth lens unit barrel 122 is controlled so that the fourth lens unit barrel 122 tracks a broken line indicating the movement locus 122 (L4 closest). For an intermediate position between the infinity and the closest distance, a locus located between the movement locus 122 (L4 infinite) and the movement locus 122 (L4 closest) is stored as data. The driving of the fourth lens unit barrel 122 is controlled in accordance with the stored data based on the focal-length information detected by the zoom sensor 106.

In FIG. 8, the driving of the fourth lens unit barrel 122 is electrically controlled so as to control an extension amount of the fourth lens unit barrel 122 in accordance with zooming. The zooming is performed manually. Hence, when the zooming is performed at high speed, a driving speed of the focus lens unit has a limit and is not high enough to achieve satisfactory zooming.

When zooming is performed at high speed from the telephoto end to the wide-angle end while the fourth lens unit L4, which is a focus lens unit, is focused to the closest distance, the fourth lens unit barrel 122 is not driven at sufficiently high speed, which may result in interference of the fourth lens unit barrel 122 with the fifth lens unit barrel 127. This interference corresponds to a state in which the fifth lens unit barrel 127 partially moves into (enters) a movement range of the fourth lens unit barrel 122. In FIG. 8, a potential interference range is illustrated as "interference area". A maximum amount A (maximum value) of an interference amount is the amount in the optical axis direction, which is defined between the movement locus (127 (L5)) of the fifth lens unit barrel 127 when zoom is set to the wide-angle end and the movement locus (122 (L4 closest)) of the fourth lens unit barrel 122 when focus is set to the closest distance and zoom is set to the telephoto end.

The interference amount in the interference area depends on the zooming speed and a speed of an actuator for the focus lens unit under a normal photographing state. Thus, in actual photographing situations, the interference may be less liable to occur. In a case of an interchangeable lens, however, when the lens barrel is removed from a camera or power is cut off while zoom is set to the telephoto end and focus is set to the closest distance, the focus lens unit is not driven. When zooming to the wide-angle end is performed under this state, the fourth lens unit barrel 122 and the fifth lens unit barrel 127 may interfere with each other with the maximum amount A of the interference amount illustrated in FIG. 8.

Figure 9:
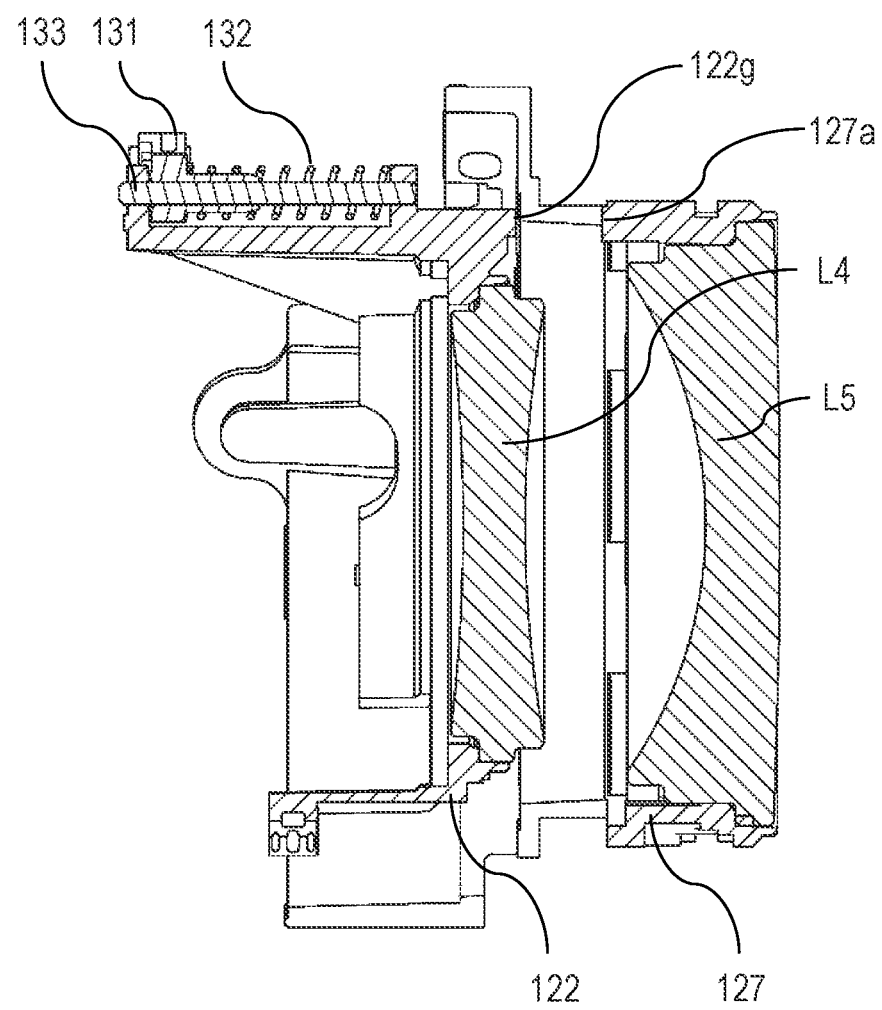
FIG. 9 is a sectional view of the fourth lens unit barrel (122) and the fifth lens unit barrel (127) in a normal state.
Figure 10:
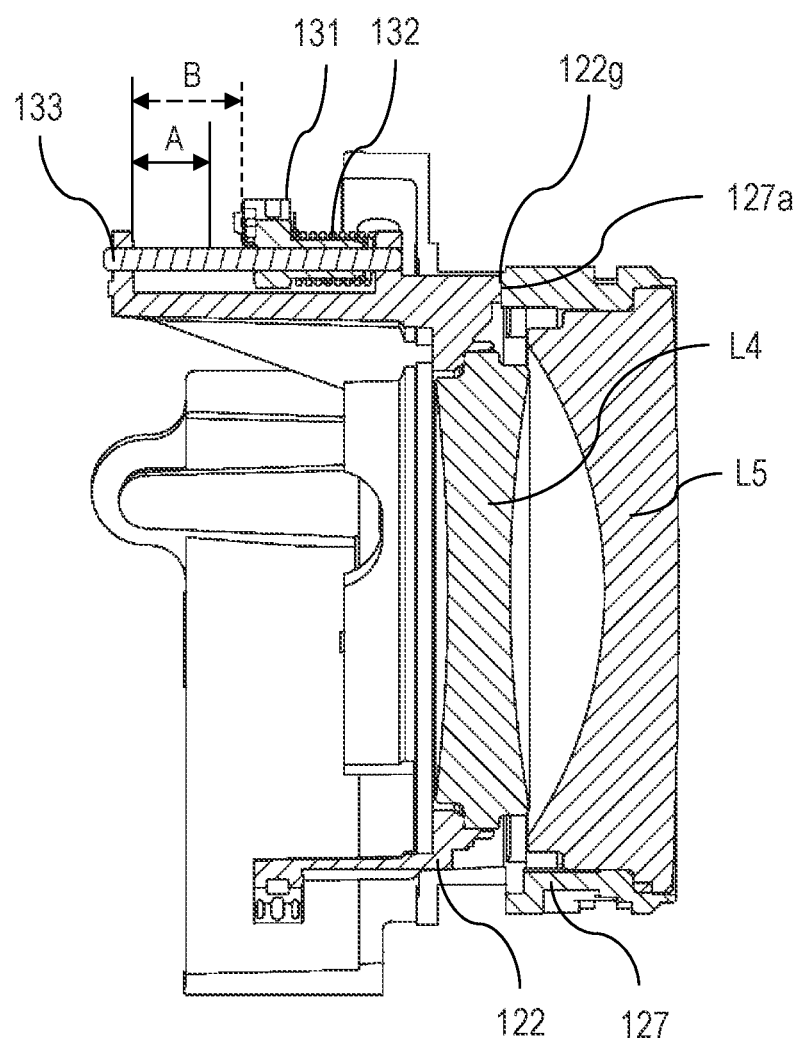
FIG. 10 is a sectional view of the fourth lens unit barrel (122) and the fifth lens unit barrel (127) in an interfering state.
Figure 11:
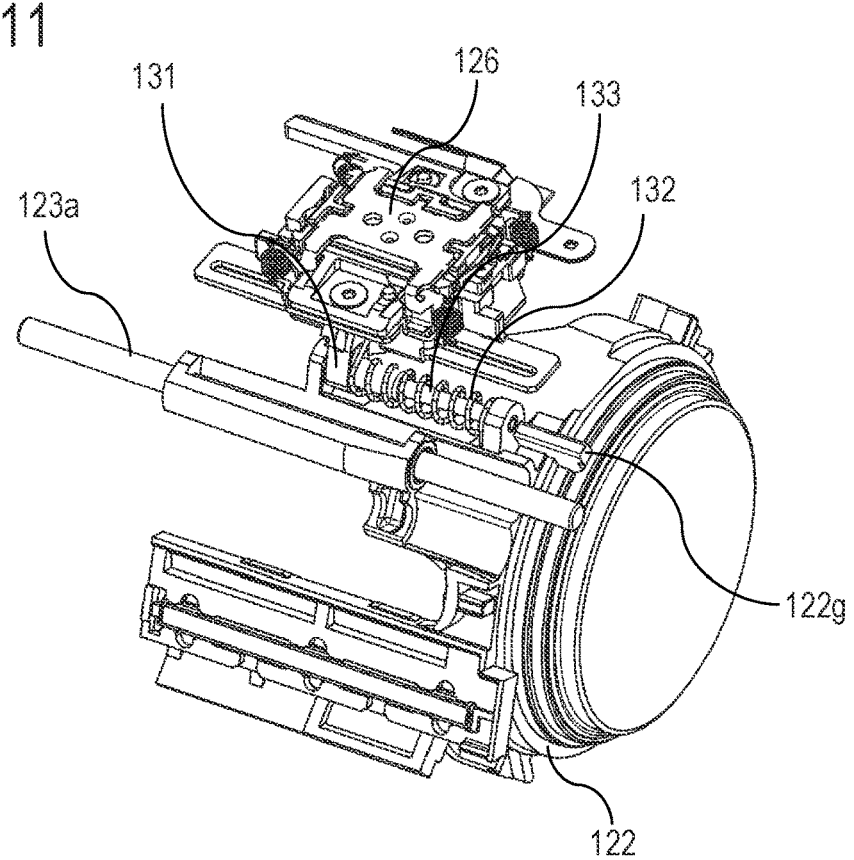
FIG. 11 is a perspective view for illustrating positions of the fourth lens unit barrel (122) and the rack (131) when the fourth lens unit barrel (122) and the fifth lens unit barrel (127) are in the normal state.
Figure 12:
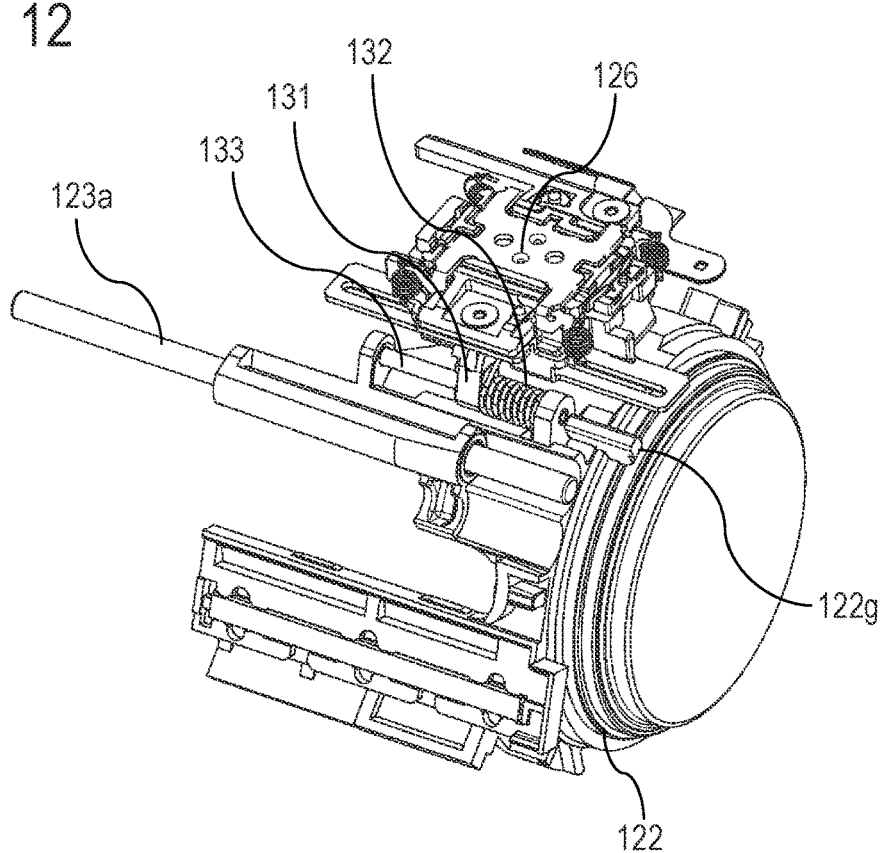
FIG. 12 is a perspective view for illustrating positions of the fourth lens unit barrel (122) and the rack (131) when the fourth lens unit barrel (122) and the fifth lens unit barrel (127) are in the interfering state.

Next, movement that occurs when the fourth lens unit barrel 122 that holds the fourth lens unit L4 interferes with the fifth lens unit barrel 127 is described. FIG. 9 is a sectional view of the fourth lens unit barrel 122 and the fifth lens unit barrel 127 under a normal state in which the fourth lens unit barrel 122 and the fifth lens unit barrel 127 do not interfere with each other. FIG. 10 is a sectional view of the fourth lens unit barrel 122 and the fifth lens unit barrel 127 under an interfering state. FIG. 11 is a perspective view for illustrating positions of the fourth lens unit barrel 122 and the rack 131 when the fourth lens unit barrel 122 and the fifth lens unit barrel 127 are in the normal state, and FIG. 12 is a perspective view for illustrating positions of the fourth lens unit barrel 122 and the rack 131 when the fourth lens unit barrel 122 and the fifth lens unit barrel 127 are in the interfering state.

As described above, when zooming is performed at high speed from the telephoto end while focus is set to the closest distance, or when zooming is performed to the wide-angle end after the lens barrel is removed from the camera and power is cut off, the fourth lens unit barrel 122 and the fifth lens unit barrel 127 may interfere with each other. When the fourth lens unit barrel 122 and the fifth lens unit barrel 127 are in the interfering state, a contact portion 122*g* of the fourth lens unit barrel 122 and a contact portion 127*a* of the fifth lens unit barrel 127 are brought into contact with each other, as illustrated in FIG. 10. As a result, the fourth lens unit barrel 122 is pushed by the fifth lens unit barrel 127 in the optical axis direction. The rack 131 is held onto the movable portion 126 of the linear ultrasonic motor 124, and hence cannot move with respect to the movable portion 126. In this embodiment, however, the rack spring 132 is compressed as illustrated in FIG. 12, and the rack 131 slides over the rack guide shaft 133. This allows the fourth lens unit barrel 122 to move together with the fifth lens unit barrel 127 in the optical axis direction. Specifically, when the fifth lens unit barrel 127 is brought into contact with the fourth lens unit barrel 122, a relative position of the fourth lens unit barrel 122 and the rack 131 in the optical axis direction change against the biasing force of the rack spring 132.

Further, a movable amount (retreat amount B) by which the rack 131 can move over the rack guide shaft 133 in the optical axis direction relative to the fourth lens unit barrel 122 is larger than the maximum amount A of the interference amount as illustrated in FIG. 10. Thus, even when the interference occurs, the lens barrel 100, the rack 131, or the linear ultrasonic motor 124 can be prevented from being damaged. After the focus lens unit completes its movement following the zooming or the power is input again to cancel the interfering state, the fourth lens unit barrel 122 and the fifth lens unit barrel 127 are returned to the initial normal state (contact state) again by the biasing force of the rack spring 132.

In this embodiment, as illustrated in FIG. 7, the rack guide shaft 133, which movably holds the rack 131, and the guide bar 123a, which guides the movement of the fourth lens unit barrel 122 in the optical axis direction, are separate components. This configuration allows a distance between the sleeve hole 122d and the sleeve hole 122e that hold the guide bar 123a of the fourth lens unit barrel 122 to be set larger than a distance set in the related art using a common shaft member as the rack guide shaft and the guide bar. As a result, tilt of the fourth lens unit barrel 122 can be reduced to thereby further improve optical performance. Further, a force acting in a direction orthogonal to an axis of the guide bar 123a can be reduced at the two sleeve holes 122d and 122e into which the guide bar 123a is fitted. Thus, twisting due to a frictional force is less liable to occur. Hence, smooth driving is enabled.

Further, in this embodiment, the rack guide shaft 133 and the rack 131 are held on the fourth lens unit barrel 122 as separate bodies. In contrast to a related-art configuration in which the shaft of the rack member extends in the optical axis direction, the above-mentioned configuration prevents the shaft of the rack member from projecting beyond the focus lens holding member in a fore-and-aft direction, which is the optical axis direction, along with the movement of the rack member. As a result, the need for spaces on the front side and the rear side of the holding portion of the rack member is eliminated, thereby reducing the overall size of the apparatus. In the related art, a space corresponding to the maximum amount A of the interference illustrated in FIG. 8 is required to be set on each of the front side and the rear side of the rack holding mechanism. Thus, when the retreat amount B increases, effects of the present disclosure also increase. Thus, according to the present disclosure, the lens barrel 100 having a reduced size can be achieved.

The lens barrel 100 allows the interference of the focus lens unit when the zooming is performed at high speed. This configuration minimizes an unnecessary clearance between the lens units to thereby achieve the lens barrel 100 having a compact overall size. Related-art design needs a distance corresponding to the maximum amount A illustrated in FIG. 8 between the lens units, while the configuration according to the present disclosure can reduce a total length of the lens barrel 100 by a reduced amount in clearances between the lens units.

In this embodiment, the linear ultrasonic motor 124 is employed to drive the focus lens unit. However, the same effects are obtained when a driving unit such as a stepping motor is employed.

This embodiment has been described for the lens barrel 100 used for an interchangeable lens for still image and moving image shooting. The same effects may be obtained when the zooming is manually performed with the lens barrel 100 for image recording. Further, this embodiment can be applied not only to downsize the lens barrel 100 that holds the focus lens unit but also to downsize a lens barrel that holds other lenses moved in zooming through contact with a fixed portion.

Further, the lens barrel 100 to which the present disclosure is applied is to be used in an image pickup apparatus including an image pickup element configured to pick up an image formed by the lens barrel 100 or an image pickup system including an image pickup apparatus main body including the lens barrel 100 that is removably mounted to the image pickup apparatus. Further, the present disclosure is applicable also to a lens-integrated image pickup apparatus. The embodiment described above is merely a typical example, and in carrying out the present disclosure, various modifications and changes may be made to the embodiment. The present disclosure is not limited to the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-075725, filed Apr. 28, 2021, which is hereby incorporated by reference herein in its entirety.

What is claimed is:

1. An optical apparatus comprising:
   a first holding member configured to hold a first lens unit;
   a second holding member configured to hold a second lens unit;
   a driving unit configured to drive the second holding member in an optical axis direction;
   a transfer member configured to transfer a driving force of the driving unit to the second holding member;
   a biasing member configured to bias the transfer member in the optical axis direction; and
   a guide member configured to guide the transfer member movably in the optical axis direction,
   wherein, in a state where the first and second holding members are spaced apart from each other, the second holding member, the transfer member, and the guide member move integrally, and
   wherein, in a state where the first and second holding members are brought into contact with each other, the second holding member and the transfer member move relative to each other.

2. The optical apparatus according to claim 1, wherein the transfer member is rotatable about an axis parallel to the optical axis direction.

3. The optical apparatus according to claim 2, wherein the biasing member biases the transfer member in a rotational direction about the axis.

4. The optical apparatus according to claim 1, wherein a maximum value of the relative movement between the second holding member and the transfer member is greater than a maximum value of interference between the movement ranges of the first and second holding members.

5. The optical apparatus according to claim 1, further comprising a base member configured to hold the driving unit and guide the second holding member so as to be movable in the optical axis direction.

6. The optical apparatus according to claim 1, wherein, in the state where the first and second holding members are brought into contact with each other, the transfer member moves in a direction opposite to a biasing direction of the biasing member.

7. An image pickup apparatus comprising:
an optical apparatus including:
- a first holding member configured to hold a first lens unit;
- a second holding member configured to hold a second lens unit;
- a driving unit configured to drive the second holding member in an optical axis direction;
- a transfer member configured to transfer a driving force of the driving unit to the second holding member;
- a biasing member configured to bias the transfer member in the optical axis direction; and
- a guide member configured to guide the transfer member movably in the optical axis direction,
wherein, in a state where the first and second holding members are spaced apart from each other, the second holding member, the transfer member, and the guide member move integrally, and
wherein, in a state where when the first and second holding members are brought into contact with each other, the second holding member and the transfer member move relative to each other; and
an image pickup element configured to receive light from the optical apparatus.

8. The image pickup apparatus according to claim 7, wherein the optical apparatus is removably mounted to the image pickup apparatus.

* * * * *